United States Patent [19]

Summers et al.

[11] 3,850,696

[45] Nov. 26, 1974

[54] PURGE TIMER FOR A FUEL CELL

[75] Inventors: Warren S. Summers, Tolland; Francis G. Charest, East Hartford, both of Conn.

[73] Assignee: United Aircraft Corporation, East Hartford, Conn.

[22] Filed: Feb. 25, 1974

[21] Appl. No.: 445,192

Related U.S. Application Data

[63] Continuation of Ser. No. 259,416, June 5, 1972, abandoned.

[52] U.S. Cl. ............................................. 136/86 B
[51] Int. Cl. ..................... H01m 27/00, H01m 31/04
[58] Field of Search ................. 136/86; 324/94, 182

[56] References Cited
UNITED STATES PATENTS

| | | | |
|---|---|---|---|
| 3,422,337 | 1/1969 | Carson | 324/29.5 |
| 3,431,481 | 3/1969 | Smyth | 324/29.5 |
| 3,463,673 | 8/1969 | Straup | 324/94 |
| 3,697,325 | 10/1972 | Baude | 136/86 B |

Primary Examiner—Winston A. Douglas
Assistant Examiner—H. A. Feeley
Attorney, Agent, or Firm—Donald F. Bradley

[57] ABSTRACT

A purge valve for purging a fuel cell is automatically opened during a purge cycle after the fuel cell has expended a preselected number of ampere-hours. In one specific embodiment a plating current, proportional to the current provided by the fuel cell, causes platable material of an electrolytic cell to be transferred from the anode to the cathode thereof whereby the platable material on the cathode is proportional to the ampere-hours that have been expended by the fuel cell. When substantially all of the platable material has been transferred, the voltage of the electrolytic cell rises, thereby initiating the purge cycle. In another embodiment a current-to-frequency converter provides pulses to a binary counter in proportion to the current provided by the fuel cell whereby the accumulated count in the counter is proportional to the expended ampere-hours. When the accumulated count corresponds to the preselected number of expended ampere-hours, the purge valve is automaticallly opened.

3 Claims, 3 Drawing Figures

3,850,696

PURGE TIMER FOR A FUEL CELL

This is a continuation of application Ser. No. 259,416 filed June 5, 1972.

BACKGROUND OF THE INVENTION

1. Field of the Invention

This invention relates to fuel cells and more particularly to apparatus for timing the purging and the interval between purges of a fuel cell.

2. Description of the Prior Art

In a fuel cell hydrogen is combined with oxygen in a manner that generates an electrical potential which may be used to provide a current. A gas fuel is provided to a separator from which the hydrogen is extracted. Oxygen may be provided from the air or alternatively from a source of substantially pure oxygen.

Typically, impurities such as nitrogen, methane, argon, carbon monoxide and carbon dioxide, are accumulated in the separator or in the oxygen supply. For efficient operation, the accumulated impurities must be periodically purged. It is well known that the accumulation of impurities is related to the number of ampere-hours expended by the fuel cell. Purge intervals of from 20 to 900 ampere-hours may be required to purge the impurities accumulated from the oxygen whereas intervals of from 900 to 12,000 ampere-hours may be required to purge the impurities from the separator. Heretofore, purging of fuel cells was manually controlled and hence, required the periodic attention of an operator.

SUMMARY OF THE INVENTION

The object of the present invention is to automatically time the interval between purges and initiate and maintain a purge cycle during which a fuel cell is purged.

According to the present invention, a purge cycle is automatically initiated in response to a fuel cell having expended a preselected number of ampere-hours.

In one specific embodiment of the present invention a plating current, proportional to the current provided by the fuel cell, is provided to an electrolytic cell thereby causing platable material to be transferred from the anode to the cathode of the cell, the accumulation of transferred material being proportional to the ampere-hours that have been expended by the fuel cell; when substantially all the platable material has been transferred, a rise in the voltage of the electrolytic cell initiates the purge cycle.

In another specific embodiment of the present invention, a current-to-frequency converter provides pulses at a rate proportional to the current provided by the fuel cell. A counter counts the pulses, the accumulated count being proportional to the ampere-hours that have been expended by the fuel cell; purge apparatus is activated in response to the counter having a preselected count.

The present invention provides for automatic purging in response to a preselected number of ampere-hours being expended by a fuel cell. The invention performs an accurate integration of the current provided by the fuel cell thereby providing an indication of the expended ampere-hours.

The present invention is highly reliable, and provides in a simple manner for the complete elimination of the need for manually purging the fuel cell.

Other objects, features and advantages of the present invention will become apparent in the light of the following detailed description of preferred embodiments thereof as illustrated in the accompanying drawing.

DESCRIPTION OF THE PREFERRED EMBODIMENT

Figure 1:
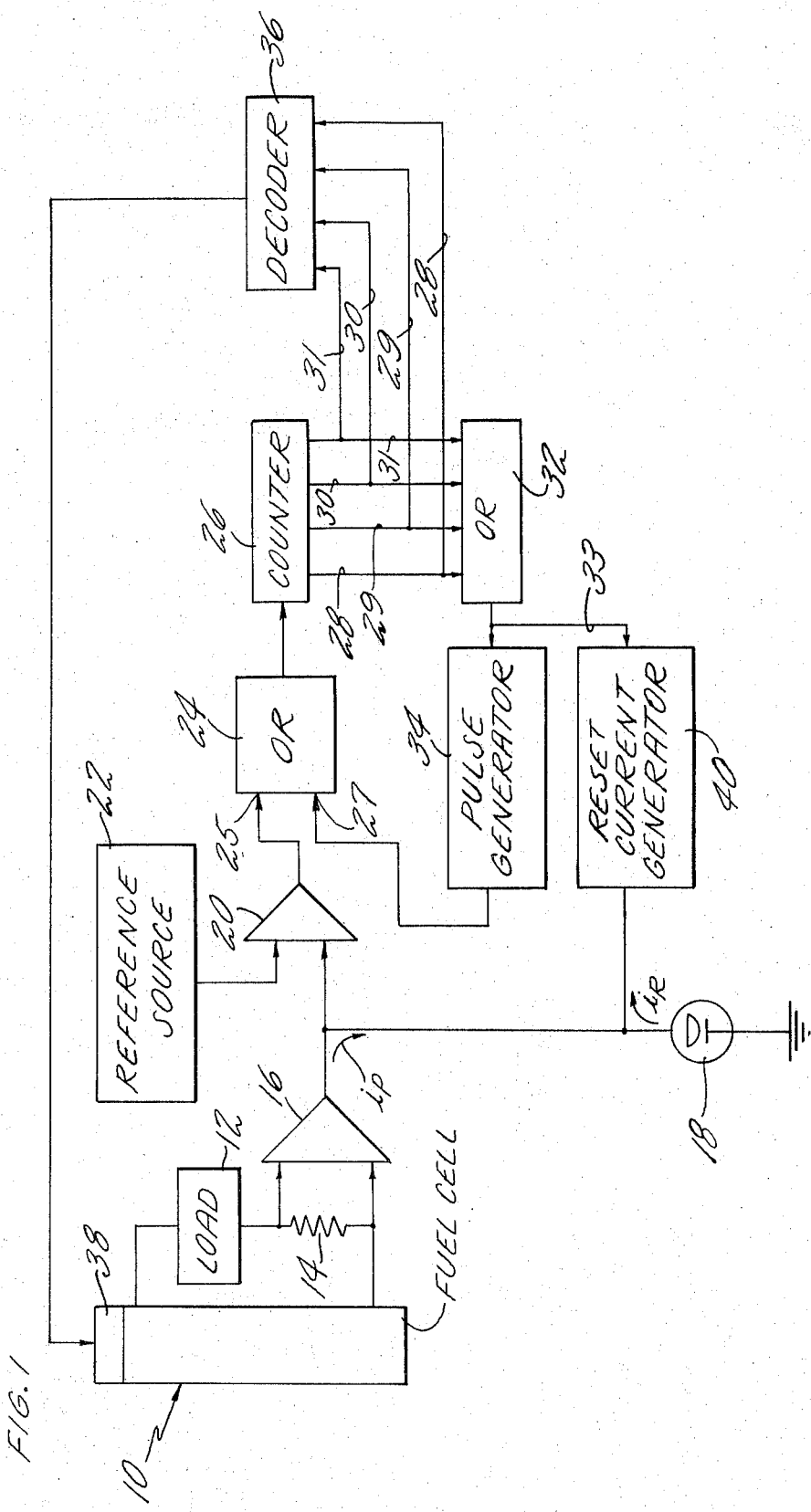
FIG. 1 is a schematic block diagram of a first embodiment of the invention.

Referring now to FIG. 1, a fuel cell 10 provides all of its current through a load 12 and a gross current shunt 14. An amplifier 16, which provides a current proportional to an applied voltage, has its input terminals connected across the shunt 14. An electrolytic cell 18, such as the cell disclosed in U.S. Pat. No. 3,423,648, is connected from the output of the amplifier 16 to ground whereby a plating current, ($i_p$), proportional to the current through the shunt 14, flows through the cell 18. The plating current causes an electrolysis whereby platable material on the anode of the cell 18 is transferred to the cathode thereof at a rate proportional to the current therethrough, and therefore also proportional to the current through the fuel cell 10. The electrolysis provides a well-known representation of the integration of the current provided by an electrical energy source (the fuel cell 10). The integral of the current is equal to the number of ampere-hours expended by the fuel cell 10. A voltage drop of only a few millivolts is provided by the cell 18 while an appreciable amount of platable material still remains on the anode. When substantially all of the platable material has been transferred, the voltage drop across the cell 18 rises to about 0.9 volts. The gain of the amplifier 16 may be selected to cause the transfer of substantially all of the platable material after a suitable number of ampere-hours have been expended by the fuel cell 10 (referred to as a purge interval hereinafter). When the voltage provided by the cell 18 rises to about 0.9 volts, a purge cycle is initiated. During the purge cycle, apparatus for purging the fuel cell 10 is activated and the platable material in the cell 18 is transferred back to the anode from the cathode, whereby the cell 18 is conditioned for timing a succeeding purge interval, as described hereinafter.

A comparison element 20, such as a differential comparator which is well known in the art, senses the rise in the voltage of the cell 18, and initiates the purge cycle. The comparison element 20 has one input connected to a reference voltage source 22 and another input connected to the cell 18. The source 22 provides a reference voltage of approximately 0.5 volts. When the voltage provided by the cell 18 rises to 0.9 volts (after a purge interval) thereby exceeding the reference voltage, the comparison element 20 provides a voltage of about 3.50 volts (referred to as ONE or 1 hereinafter); under all other conditions of operation the comparison element 20 provides an output of ground potential (referred to as ZERO or 0 hereinafter).

An OR circuit 24 which has OR inputs 25, 27, has the OR input 25 connected to the output of the comparison element 20; the connection of the OR input 27 is described hereinafter. The OR circuit 24 provides ONE at its output in response to the comparison element 20 providing a ONE (or a ONE being provided to the OR input 27 as described hereinafter).

The output of the OR circuit 24 is connected to the input of the binary counter 26 whereby transitions from ZERO to ONE at the inputs 25, 27, are counted by the counter 26; logic signals (ONEs and ZEROs) are provided on lines 28–31 indicative of the number of transitions. The logic signal provided on the line 31 is indicative of the lowest order binary bit of the binary count stored in the counter 26; the logic signal on the line 28 is indicative of the highest order bit. During a purge interval the counter 26 provides ZERO on each of the lines 28–31. When the voltage of the cell 18 rises to 0.9 volts the comparison element 20 provides the transition from ZERO to ONE through the OR circuiit 24 to the input of the counter 26 which causes the low order line 31 to provide ONE. The counter 26 is connected through the lines 28–31 to an OR circuit 32 which provides an output of ONE on a line 33 in response to one or more of the lines 28–31 providing ONE at the inputs thereof. The output of the OR circuit 32 is connected to the input of a gated pulse generator 34 which provides logic signal pulses (thereby providing transitions from ZERO to ONE) to the counter 26 through the OR circuit 24 for timing the purge cycle. The pulses are provided by the pulse generator 34 at two minute intervals in response to ONE being provided by the OR circuit 32. The output of the pulse generator 34 is connected to the input 27 referred to hereinbefore. The counter 26 counts the pulses (15 pulses) until the lines 28–31 all provide ZERO to the OR circuit 32, which provides ZERO to the pulse generator 34. The lines 28–31 are connected to the input of a decoder 36 which causes a purge valve to open for a desired time interval. In response to the counter 36 providing 0001 on the line 28–31 (a 2-minute interval) the decoder 36 provides logic ONE on the output thereof. The output of the decoder 36 is connected to a purge valve 38 within the fuel cell 10. In response to logic ONE provided by the decoder 36, the valve 38 opens whereby the fuel cell is purged in any manner known in the art and not important herein.

A reset current generator 40 provides, during the purge cycle, a reset current ($i_R$) to the cell 18 for transferring the platable material from the cathode back to the anode. The generator 40 has its input connected to the output of the OR circuit 32 and its output connected to the cell 18. In response to ONE being provided by the OR circuit 32 (a 30-minute interval) the reset current generator 40 provides the reset current ($i_R$) to the cell 18. The reset current ($i_R$) is very much larger than the current provided to the cell 18 by the amplifier 16. The polarity of the reset current ($i_R$) is such that material on the cathode of the cell 18 is transferred to the anode during the 30-minute interval.

After the 30-minute interval the purge timer is in a condition to integrate the current provided by the amplifier 16 whereby a subsequent purge interval is timed and a purge cycle is initiated and maintained.

Figure 2:
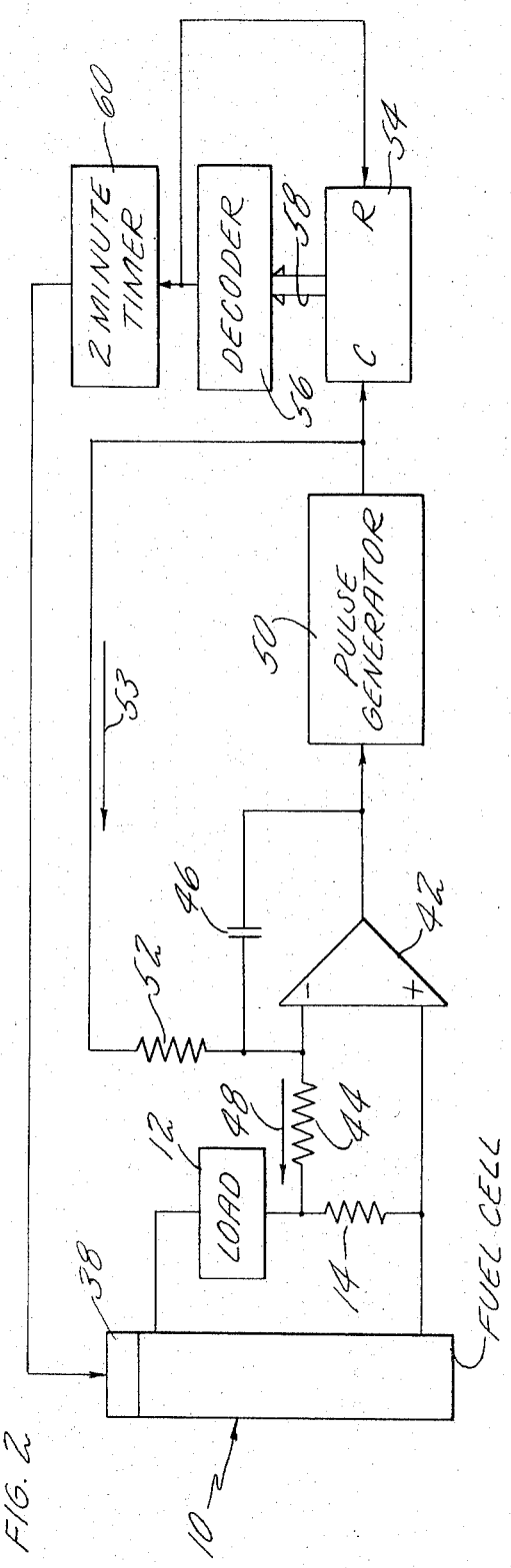
FIG. 2 is a schematic block diagram of a second embodiment of the invention.
Figure 3:
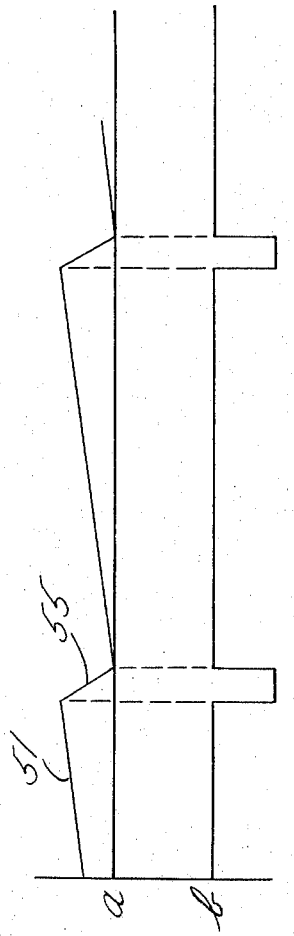
FIG. 3 is an illustration of waveforms, all on a common time base, illustrating the operation of portions of the embodiment of FIG. 2.

Referring now to FIG. 2 a second embodiment of the present invention includes a current-to-frequency converter which provides pulses at a rate proportional to the current provided by the fuel cell 10. The cumulative number of pulses provided by the converter is therefore proportional to the ampere-hours expended by the fuel cell 10. The converter is comprised of a well-known integration circuit and a pulse generator. The integration circuit includes an operational amplifier 42, a resistor 44 and an integration capacitor 46. The amplifier 42 has its inverting input connected through a resistor 44 to one side of the shunt 14 and its noninverting input connected to the other side. The capacitor 46 has one end connected to the inverting input of the amplifier 42 and the other end connected to the output thereof. As is well known in the art, the integration circuit provides a voltage proportional to the integral of the current through the resistor 44 (proportional to, but much less than, the current through the shunt 14). The direction of the current through the resistor 44 is indicated by an arrow 48. Referring to FIG. 3, waveforms related to the embodiment shown in FIG. 2 include the waveform of the voltage provided at the output of the amplifier 42 (FIG. 2, illustration a). A ramp 51 is representative of the portion of the output waveform of the amplifier 42 caused by the current through the resistor 44 (FIG. 1). The output of the amplifier 42 is connected to the input of a pulse generator 50. When the output of the amplifier 42 is at a preselected voltage, the pulse generator 50 provides a pulse (FIG. 2 illustration b) to a resistor 52 (FIG. 1) causing a current therethrough in the direction indicated by an arrow 53. The current through the resistor 52 is much larger than the current through the resistor 44 and thereby causes a rate of change of the voltage at the output of the amplifier 42 which is much larger and opposite from the rate of change caused by the current through the resistor 44. A ramp 55 (FIG. 3, illustration a) is representative of the portion of the output waveform of the amplifier 42 caused by the current through the resistor 52. At the end of the pulse provided by the pulse generator 50, the amplifier 42 is solely responsive to the current through the resistor 44.

The output of the pulse generator 50 is connected to the input, (c), of a binary counter 54. The outputs of the counter 54 are provided to a decoder 56 through signal lines 58. In response to the counter 54 having counted a predetermined number of pulses corresponding to a desired purge interval, the decoder 56 provides a ONE to a 2-minute timer 60. The timer 60 is connected to the purge valve 38 and provides a signal thereto causing the valve to open for two minutes and thereby purge the fuel cell 10. The output of the decoder is also connected to a reset input, (R), of the counter 54. ONE, provided by the decoder 56, causes the counter 54 to provide ZERO on the lines 58, thereby conditioning the counter 54 to count succeeding pulses whereby a subsequent purge interval and purge cycle may be respectively timed and maintained.

Thus, there has been shown apparatus for providing a purge cycle after a fuel cell has expended a selected number of ampere-hours.

Although the invention has been shown and described with respect to preferred embodiments thereof, it should be understood by those skilled in the art that changes and omissions in the form and detail thereof may be made therein without departing from the spirit and the scope of the invention.

Having thus described typical embodiments of our invention, that which we claim as new and desire to secure by Letters Patent of the United States is:

1. A purge control for a fuel cell comprising means responsive to the current generated by said fuel cell for producing a plating current proportional thereto, means including an electrolytic cell receiving said plating current and producing a voltage pulse upon the occurrence of a predetermined ampere-hours output by said fuel cell, a binary counter adapted to produce an output count which varies from zero to a preselected binary number and then returns to zero, means connecting said voltage pulse with said binary counter, said voltage pulse producing a change in the output of said counter from a zero state to a binary one state in response thereto, pulse generator means actuated by the occurrence of a binary state other than zero in the output of said counter for producing a series of timing pulses at equal preselected time intervals, means for connecting said timing pulses with said binary counter to cause said counter to advance its output count from a binary one to a binary zero, purge means for said fuel cell, means responsive only to the presence of a binary one in the output of said counter for causing actuation of said purge means for a time equal to one of said time intervals, means responsive only to the presence of a binary state other than zero in the output of said counter for producing a reset current adapted to reset said electrolytic cell, and means connecting said reset current with said electrolytic cell.

2. A purge control as in claim 1 in which said reset current is of a polarity opposite from and of a magnitude much greater than said plating current.

3. A purge control as in claim 1 in which said electrolytic cell contains platable material which is transferred from one electrode of said cell to another at a rate proportional to said plating current, said reset current transferring said platable material back to said one electrode.

* * * * *